June 2, 1953    S. W. LONG    2,640,684
FRICTION CATHEAD
Filed May 14, 1946    2 Sheets-Sheet 1
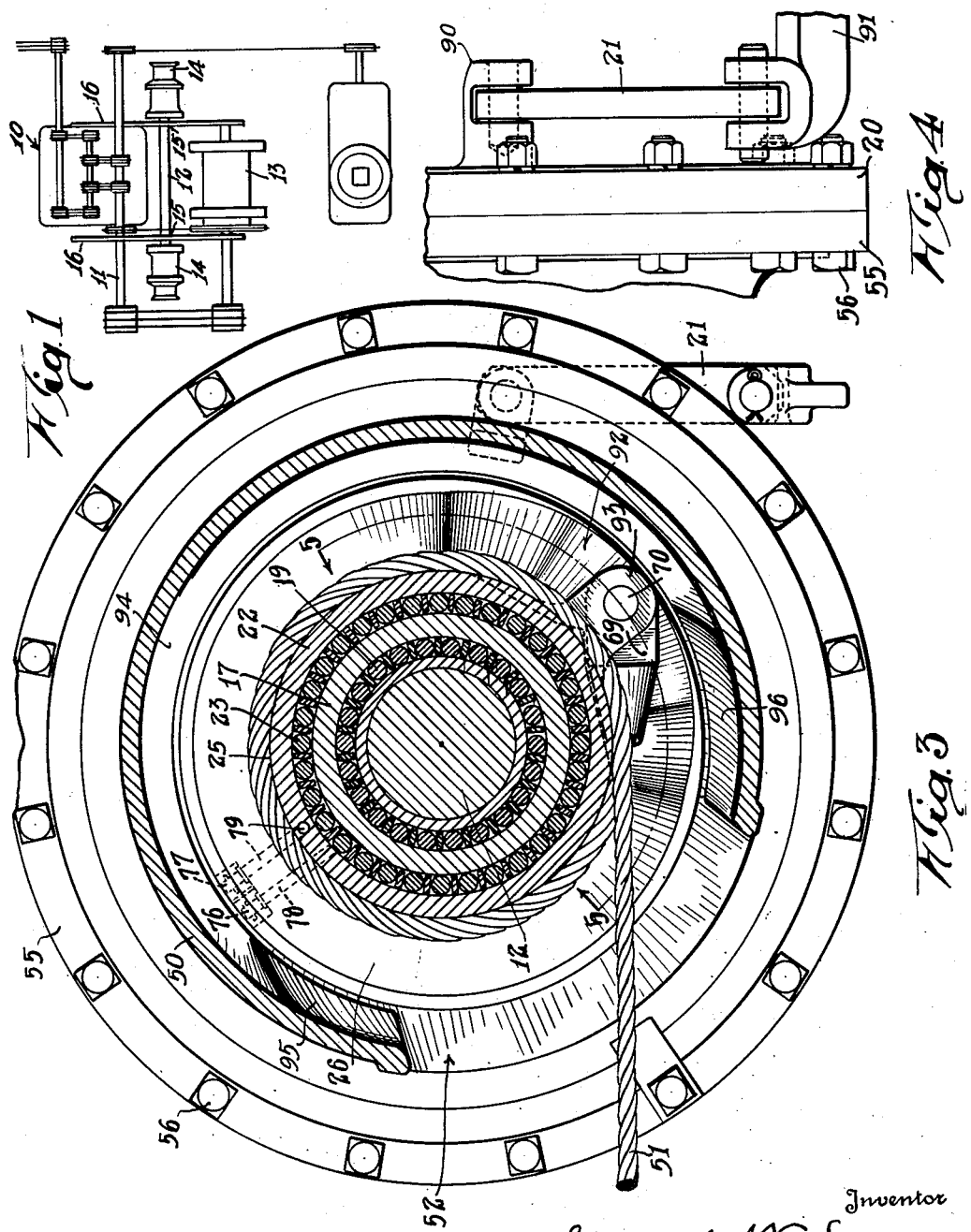
Inventor
Spencer W. Long
By Lyon & Lyon
Attorneys June 2, 1953  S. W. LONG  2,640,684
FRICTION CATHEAD
Filed May 14, 1946  2 Sheets-Sheet 2
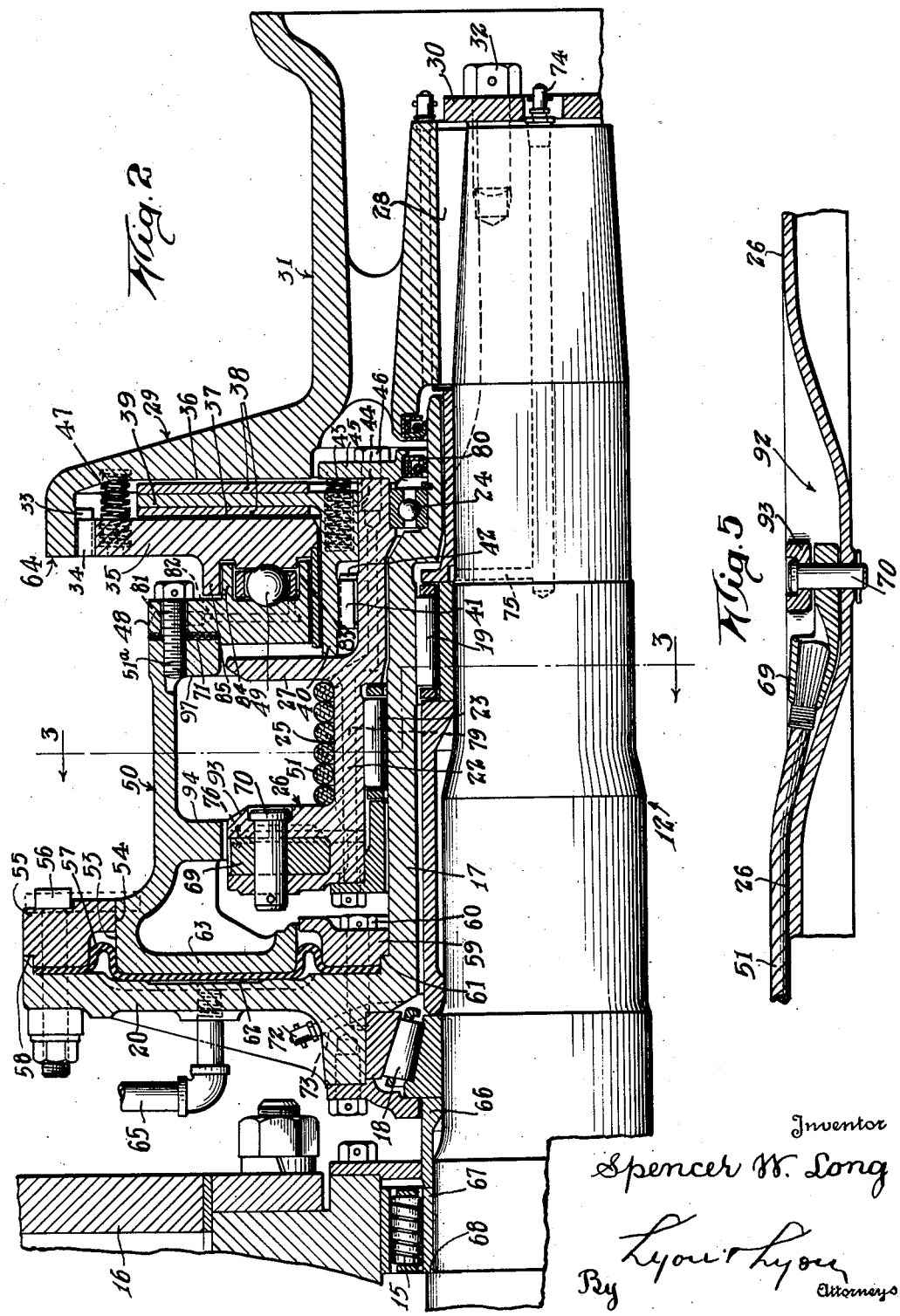
Inventor
Spencer W. Long
By Lyon & Lyon
Attorneys Patented June 2, 1953

2,640,684

UNITED STATES PATENT OFFICE 2,640,684

FRICTION CATHEAD

Spencer W. Long, Inglewood, Calif., assignor to The National Supply Company, Pittsburgh, Pa., a corporation of Pennsylvania Application May 14, 1946, Serial No. 669,518

31 Claims. (Cl. 254—187)

This invention relates to well drilling equipment, and is particularly directed to spooling apparatus for line used in screwing and unscrewing joints of drill pipe and casing. Such apparatus is commonly known as a spinning line cathead and is used extensively in connection with pipe tongs for making up and breaking out threaded pipe connections.

It is the principal object of this invention to provide a spinning line cathead which is of universal application in that it is equally adaptable for making up, breaking out, and spinning the pipe.

Another object is to provide a device of this type having a spooling drum rotatably mounted on a stationary element and being selectively engageable with a rotating shaft, without shifting the drum axially.

Another object is to provide a spooling drum for a spinning line, together with a clutch mechanism for driving the drum on one side thereof and power means for actuating the clutch mechanism on the other side of the spooling drum.

A further object is to provide a device of this type in which the spooling drum is mounted free from any rotational friction drag of the power shaft, and also free of any axial loads imposed by the clutch mechanism, or the power means for actuating the clutch mechanism.

Other objects and advantages will appear hereinafter.

In the drawings:

Fig. 1 is a diagrammatic plan view illustrating a well drilling rig including a drawworks, equipped with cathead devices embodying this invention. Fig. 2 is a partial sectional elevation on an enlarged scale of the cathead device shown in Fig. 1. Fig. 3 is a sectional view taken substantially on the line 3—3 as shown in Fig. 2, but with the spooling drum revolved to a different position. Fig. 4 is a fragmentary detail in rear elevation showing the torque link mounting for restraining rotation of the stationary parts of the device. Fig. 5 is a developed plan view taken substantially on line 5—5 as shown on Fig. 3.

Referring to the drawings, the drawworks generally designated 10 may be provided with the usual line shaft 11, catshaft 12 and main drum 13, together with the customary transmission connections. The universal cathead unit embodying my invention is designated 14 and is preferably mounted on the projecting ends of the catshaft 12. The catshaft 12 is rotatably supported in spaced bearings 15 carried by the frame 16. A nonrotatable sleeve 17 encircles a portion of the projecting end of the shaft 12 and is rotatably supported thereon by means of the thrust bearing 18 and the radial bearing 19. A flange 20 integral with the sleeve 17 extends radially from one end thereof, and is anchored against rotation by means of a torque link 21. The link 21 is pivotally connected to a fitting 90 fixed on the flange 20 and to a bracket 91 extending to the frame 16. A spooling drum member 22 is rotatably mounted on the stationary sleeve 17 by means of the axially spaced bearings 23 and 24. The radial bearing 23 is positioned directly below the line spooling surface 25 between the flanges 26 and 27, while the radial thrust bearing 24 prevents relative axial movement between the spooling drum 22 and the sleeve 17.

Mounted on the tapered end of the catshaft 12 and secured by a key 28 is a clutch housing element 29. A removable abutment piece 30, secured by removable cap screws 32, maintains the clutch housing element 29 in position on the catshaft 12. A conventional cathead 31 may be provided on the element 29, as shown. The clutch housing element 29 is provided with a series of internal spline teeth 33 adapted to receive the external spline teeth 34 formed on the periphery of the clutch clamping element 35. The clutch elements 29 and 35 are provided with flat radial faces 36 and 37, respectively, adapted for frictional engagement with the lining 38 secured on both sides of the intermediate clutch disk 39. The clutch disk 39 is formed integrally with an axially extending hub 40 which encircles a portion of the drum member 22, and intermeshing spline teeth 41 and 42 are formed on the hub 40 and drum member 22, respectively, providing a rotary driving connection therebetween.

A plurality of retraction springs 43 are mounted within recesses 44 in the hub 40. Each of these springs 43 is confined between the bottom of its recess 44 and the end flange 45 removably connected to the hub by a series of cap screws 46. The springs 43 resiliently maintain the end of the hub 40 in contact with the drum flange 27, and thus maintain the friction disk 39 midway between the clutch surfaces 36 and 37 and in contact with neither. Additional retraction springs 47 are provided radially outwardly from the disk 39 for the purpose of resiliently spreading the clutch elements 29 and 35.

Means are provided for actuating the axially movable clutch element 35, and as shown in the drawings, this means includes a thrust applying disk 48 and a thrust bearing assembly 49. A nonrotatable guard 50 for the line 51 spooled on the drum 22 extends transversely across the drum 22 between the flanges 26 and 27 and is attached to the thrust disk 48 at its outer end by means of cap screws 51ª. The line guard 50 is provided with a window 52, as shown in Fig. 3, through which the line 51 emerges from the spooling drum 22. A cylindrical surface 53 on the guard 50 is received in sliding relation within the cooperating cylindrical surface 54 on the retainer ring 55 secured to the stationary flange 20. Bolts 56 secure the ring 55 to the flange 20 and clamp the outer periphery of the flexible annular diaphragm 57 therebetween. The initial compression of the diaphragm thus clamped is fixed by the engagement of the mating shoulders 58. The inner circumference of the flexible diaphragm 57 is secured in a similar manner between the clamping ring 59 and the flange 20, by cap screws 60, and the initial compression is similarly determined by the engagement of the mating shoulders 61. The annular space 62 between the flange 20 and the annular diaphragm 57 constitutes a chamber for fluid pressure. The annular piston 63 formed integrally with the line guard 50 moves axially under the force of the fluid pressure to actuate the friction clutch, generally designated 64. Fluid under pressure, for example, compressed air, is admitted into the chamber 62 by way of the inlet fitting 65, and is exhausted through the same opening by suitable valve means, not shown.

The pressure exerted on the piston 63 by the diaphragm 57 moves the piston 63 and line guard 50 axially away from the flange 20. During this movement the piston 63 is guided within the cylindrical bore 54, and the pressure disk 48 is maintained centrally by means of the thrust bearing assembly 49. Also during this movement there is relative axial movement between the splines 33 and 34, and between the splines 41 and 42. Upon relaxation of the fluid pressure within the chamber 62 the compression springs 47 return the parts 35, 49, 48 and 50 to their initial position. The total axial movement of the line guard 50 to effect complete engagement of the friction clutch 64 is comparatively small.

When the fluid pressure effects engagement of the friction clutch 64, the axial load on the clutch housing 29 is taken by the abutment 30 and cap screws 32, and thus transmitted to the catshaft 12. The thrust reaction on the stationary flange 20 is taken by the thrust bearing 18, and through the collar 66, inner race 67, to the shoulder 68 on the shaft 12. It will therefore be understood that the thrust loads incident to engaging the friction clutch 64 are balanced out within the projecting portion of the shaft and do not develop any endwise load on the supporting bearings for the shaft.

Shims 71 may be provided between the line guard 50 and the pressure disk 48 in order to adjust the clearances between the friction disk 39 and the clutch surfaces 36 and 37.

The line 51 which is spooled on the surface 25 of the drum 22 has one end secured to a terminal fitting 69. A pivot pin 70 connects the terminal fitting 69 to the flange 26 and lug 93. The flange 26 is recessed at 92 to receive the fitting 69 and the outer surface of the lug 93 is formed flush with the flange surface 26 in a manner to avoid projections upon which the line 51 might become fouled. The pivotal recessed mounting for the terminal fitting 69 allows the line 51 to be wound in either direction on the spooling drum 22, and hence the same drum 22 may be employed in both the right hand and left hand installations shown in Fig. 1. Furthermore, continued rotation of the drum 22 after the line 51 has been fully unspooled does not result in fouling of the line. The terminal fitting 69 simply pivots on the pin 70 to allow the line to spool in the reverse direction. The non-rotatable arcuate surface 94 and the annular surface 97 within the guard member 50 are positioned in substantial alignment with the drum flanges 26 and 27 respectively, and prevent the line from passing over the circumferential edges of the flanges. Also, the cam surfaces 95 and 96 at the ends of the arcuate surface 94 change gradually from a level at the window 52' substantially flush with the bottom of the recess 92 to the position of the plane of the arcuate surface 94. Thus the cam surfaces 95 and 96 which at their extreme ends adjacent the window 52 are substantially flush with the bottom of the recess 92 serve to deflect the line 51 into proper spooling position on the drum 22 upon reversal of position of the terminal fitting 69, and fouling of the line adjacent the window opening 52 is thereby avoided.

Means are provided for lubricating each of the bearings and for sealing them against the escape of lubricant and to exclude foreign matter. Thus, the thrust bearing 18 is lubricated from pressure fitting 72 via passage 73 in the stationary sleeve member 17. Radial bearing 19 receives lubricant from fitting 74 via passage 75 in the shaft 12. The bearings 23 and 24 for the spooling drum are lubricated from fittings 76 and 77, respectively, mounted in the drum flange 26, and reaching the bearings through passages 78 and 79, respectively. A grease seal 80 is carried by the annular flange 45 to prevent escape of lubricant from the thrust bearing 24. It should be noted that the seal 80 runs on the stationary sleeve 17 to avoid the rotary frictional drag which would otherwise tend to rotate the spooling drum 22 if the seal 80 were to contact the shaft 12.

Lubricant reaches the thrust bearing 49 from the fitting 81 and passage 82 in the pressure disk 48. Overlapping flanges 83, 84 and 85 provide labyrinth seals for the bearing 49.

It will be understood from the foregoing description that the spooling drum 22 rotates freely on the stationary sleeve without frictional drag from the rotary catshaft 12. Furthermore, the drum 22 does not shift axially and therefore it can be mounted on roller bearings. No endwise force is transmitted through the drum for engagement of the friction clutch 64 and, hence, it can have a low moment of inertia. It is in effect isolated from both axial and rotary frictional drag. This is an important advantage since it permits the line 51 to be unspooled easily by an operator manually pulling the line through the window 52 in the line guard 50. Furthermore, the pivotal mounting for the end of the line and the effective shrouding of the drum prevent fouling of the line upon continued rotation of the drum after the line is fully unspooled.

Having fully described my invention, it is to be understood that I do not wish to be limited to the details herein set forth, but my invention is of the full scope of the appended claims.

I claim:

1. In a device of the class described, the combination of a rotatable shaft, a non-rotatable sleeve encircling a portion of said shaft, a spooling drum rotatably mounted on the sleeve, clutch means for establishing a releasable driving connection from the shaft to the spooling drum, said means including a friction clutch assembly mounted coaxially of the shaft and positioned at one side of the spooling drum, power means for actuating the clutch means including an element axially movable by fluid pressure and positioned on the other side of the spooling drum, and thrust-transmitting means positioned radially outwardly of the spooling drum operatively interposed between the said element and the friction clutch assembly.

2. In a device of the class described, the combination of a shaft, a spooling drum rotatably mounted coaxially of the shaft, clutch means for establishing a releasable driving connection from the shaft to the spooling drum, said means including a friction clutch assembly mounted coaxially of the shaft and positioned at one side of the spooling drum, power means for actuating the clutch means including an element axially movable by fluid pressure and positioned on the other side of the spooling drum, and thrust-transmitting means positioned radially outwardly of the spooling drum operatively interposed between the said element and the friction clutch assembly.

3. In a device of the class described, the combination of a rotatable shaft, a non-rotatable sleeve encircling a portion of said shaft, a spooling drum rotatably mounted on the sleeve and held against axial movement thereon, clutch means for establishing a releasable driving connection from the shaft to the spooling drum, said means including a friction clutch assembly mounted coaxially of the shaft and positioned at one side of the spooling drum, an axially movable actuating element positioned on the other side of the spooling drum, and means for transmitting axial thrust from said element to said friction clutch assembly independently of the spooling drum.

4. In a device of the class described, the combination of a rotatable shaft, a non-rotatable sleeve encircling a portion of said shaft, a spooling drum rotatably mounted on the sleeve and held against axial movement thereon, a non-rotatable element positioned on one side of the spooling drum and adapted for axial movement relative thereto, selectively operable means adapted to drive the spooling drum from the shaft including a friction clutch assembly mounted coaxially of the shaft and positioned on the other side of the spooling drum, the clutch assembly being provided with a rotatable clutch engaging element, and means for transmitting axial thrust from said non-rotatable element to said rotatable element independently of the spooling drum, whereby the friction clutch may establish a driving engagement from the shaft to the spooling drum.

5. In a device of the class described, the combination of a rotatable shaft, a non-rotatable sleeve encircling a portion of said shaft, a spooling drum rotatably mounted on the sleeve and held against axial movement thereon, a non-rotatable element positioned on one side of the spooling drum and adapted for axial movement relative thereto, selectively operable means adapted to drive the spooling drum from the shaft including a friction clutch assembly mounted coaxially of the shaft and positioned on the other side of the spooling drum, the clutch assembly being provided with a rotatable clutch engaging element, and means for transmitting axial thrust from said non-rotatable element to said rotatable element independently of the spooling drum, whereby the friction clutch may establish a driving engagement from the shaft to the spooling drum, said means including thrust bearing means interposed between said rotatable and non-rotatable elements.

6. In a device of the class described, the combination of a shaft, a spooling drum rotatably mounted coaxially of the shaft and adapted to have a line spooled thereon, clutch means axially positioned at one side of the spooling drum adapted to establish a releasable driving connection between the shaft and the spooling drum, power means axially positioned at the other side of the spooling drum, and thrust-transmitting means including a guard for the line spooled on the drum operatively positioned between the power means and the clutch means.

7. In a device of the class described, the combination of a shaft, a spooling drum rotatably mounted coaxially of the shaft and adapted to have a line spooled thereon, clutch means axially positioned at one side of the spooling drum adapted to establish a releasable driving connection between the shaft and the spooling drum, power means axially positioned at the other side of the spooling drum, and thrust-transmitting means whereby the power means may effect engagement of the clutch means, including a guard for the line spooled on the drum and a thrust bearing operatively interposed between the guard and the clutch means.

8. In a device of the class described, the combination of a rotatable shaft, a non-rotatable sleeve encircling a portion of said shaft, a spooling drum member rotatably mounted on the sleeve and maintained against axial movement relative thereto, clutch means for establishing a releasable driving connection from the shaft to the spooling drum member; said means including an axially movable friction disc having a slidable and non-rotatable engagement with the spooling drum member and encircling a portion thereof; cooperating drive elements rotatable with the shaft, and means for clamping the friction disk between the drive elements.

9. In a device of the class described, the combination of a rotatable shaft, a non-rotatable sleeve encircling a portion of said shaft, a spooling drum member rotatably mounted on the sleeve and maintained against axial movement relative thereto, clutch means for establishing a releasable driving connection from the shaft to the spooling drum member, said means including a first drive element secured with respect to the shaft, a second drive element mounted for slidable but non-rotatable movement relative to the first drive element, an axially movable friction disk interposed between said elements and having a slidable but non-rotatable engagement with the spooling drum member and encircling a portion thereof; and means for moving the second drive element toward the first drive element to clamp the friction disk therebetween.

10. In a device of the class described, the combination of a rotatable shaft, a non-rotatable sleeve encircling a portion of said shaft, a spooling drum member rotatably mounted on the sleeve and maintained against axial movement relative thereto, clutch means for establishing a releasable driving connection from the shaft to the spooling drum member; said means including a first drive element secured with respect to the shaft, a second drive element mounted for slidable but non-rotatable movement relative to the first drive element, an axially movable friction disk interposed between said elements and having a slidable but non-rotatable engagement with the spooling drum member and encircling a portion thereof, and means for moving the second drive element toward the first drive element to clamp the friction disk therebetween, said means including a nonrotatable actuating member and a thrust bearing positioned between said member and the second drive element.

11. In a device of the class described, the combination of a rotatable shaft, a non-rotatable sleeve encircling a portion of said shaft, a spooling drum member rotatably mounted on the sleeve and maintained against axial movement relative thereto, clutch means for establishing a releasable driving connection from the shaft to the spooling drum member, said means including a friction disk at one side of the spooling drum member and slidably but non-rotatably connected therewith, and power means at the other side of the spooling drum member adapted to actuate the clutch means.

12. In a device of the class described, the combination of a rotatable shaft, a non-rotatable sleeve encircling a portion of said shaft, a spooling drum member rotatably mounted on the sleeve and maintained against axial movement relative thereto, clutch means for establishing a releasable driving connection from the shaft to the spooling drum member, said means including a friction disk at one side of the spooling drum member and slidably but non-rotatably connected therewith, a non-rotatable thrust-transmitting member positioned radially outwardly of the spooling drum member and adapted to actuate said clutch means, and fluid operated power means for axially moving the thrust transmitting member.

13. In a device of the class described, the combination of a shaft, a spooling drum rotatably mounted coaxially of the shaft, releasable clutch means at one side of the spooling drum adapted to connect it in driving relation with the shaft, said clutch means including an element encircling a portion of the spooling drum, fluid actuated power means at the other side of the spooling drum, and a thrust-transmitting member independent of the spooling drum adapted to actuate the clutch means from the power means.

14. In combination, a rotatable shaft having a shoulder and an axially spaced abutment, a non-rotatable sleeve member encircling a portion of the shaft between the shoulder and abutment, a thrust bearing operatively interposed between the sleeve member and said shoulder, a flange on the non-rotatable sleeve member, an axially movable element slidably mounted with respect to the flange and defining a fluid pressure chamber therebetween, an axially immovable clutch element secured to the shaft against said abutment, an axially movable clutch element slidably mounted with respect to the axially immovable clutch element, a spooling drum rotatably mounted on the non-rotatable sleeve member between the fluid pressure chamber and the clutch elements, an axially movable friction disk interposed between said clutch elements and having a slidable but non-rotatable engagement with the spooling drum, and a thrust-transmitting member operatively interposed between the said movable element of the pressure chamber and the axially movable clutch element adapted to establish a releasable driving connection between the shaft and the spooling drum upon introduction of fluid into the pressure chamber.

15. In combination, a rotatable shaft having a shoulder and an axially spaced abutment, a non-rotatable sleeve member encircling a portion of the shaft between the shoulder and abutment, a thrust bearing operatively interposed between the sleeve member and said shoulder, a flange on the non-rotatable sleeve member, an axially movable element slidably mounted with respect to the flange and defining a fluid pressure chamber therebetween, an axially immovable clutch element secured to the shaft against said abutment, an axially movable clutch element slidably mounted with respect to the axially immovable clutch element, a spooling drum rotatably mounted on the non-rotatable sleeve member between the fluid pressure chamber and the clutch elements, an axially movable friction disk interposed between said clutch elements and having a slidable but non-rotatable engagement with the spooling drum, and means including a thrust bearing operatively connecting the axially movable clutch element with the movable element of the fluid pressure chamber, whereby a driving connection may be established between the shaft and the spooling drum upon introduction of fluid into the pressure chamber.

16. In combination, a rotatable shaft having a shoulder and an axially spaced abutment, a non-rotatable sleeve member encircling a portion of the shaft between the shoulder and abutment, a thrust bearing operatively interposed between the sleeve member and said shoulder, a flange on the non-rotatable sleeve member, an axially movable element slidably mounted with respect to the flange and defining a fluid pressure chamber therebetween, an axially immovable clutch element secured to the shaft against said abutment, an axially movable clutch element slidably mounted with respect to the axially immovable clutch element, a spooling drum rotatably mounted on the non-rotatable sleeve member between the fluid pressure chamber and the clutch elements, an axially movable friction disk interposed between said clutch elements and having a slidable but non-rotatable engagement with the spooling drum, resilient means normally acting to axially separate the clutch elements, and thrust-transmitting means operatively connecting the axially movable clutch element with the movable element of the fluid pressure chamber, whereby the friction disk may be clamped between said clutch elements upon introduction of fluid into the pressure chamber.

17. In a device of the class described, the combination of a shaft, a spooling drum rotatably mounted coaxially of the shaft, releasable clutch means at one side of the spooling drum adapted to connect it in driving relation with the shaft, said clutch means comprising a first clutch element secured to the shaft, a second clutch element axially movable but non-rotatable with respect thereto, an axially movable friction disk interposed between said clutch elements and having a slidable but non-rotatable engagement with the spooling drum and encircling a portion thereof, a thrust applying member adapted to clamp the friction disk between said clutch elements, a thrust bearing operatively interposed between the thrust applying element and the second clutch element, a non-rotatable axially immovable member on the other side of the spooling drum, and fluid operated means operatively interposed between said member and the thrust applying member selectively operable to actuate the latter.

18. In a device of the class described, the combination of a shaft, a spooling drum rotatably mounted coaxially of the shaft, releasable clutch means at one side of the spooling drum adapted to connect it in driving relation with the shaft, said clutch means comprising cooperating friction elements actuated by relative axial movement, at least one of said friction elements encircling a portion of the spooling drum, thrust means including a bearing for actuating the friction elements to engage the clutch means, a nonrotatably axially immovable member on the other side of the spooling drum, and fluid operated means operatively interposed between said member and the thrust means selectively operable to actuate the latter.

19. In combination, a rotary shaft supported in spaced bearings and having a projecting end extending beyond one of the bearings, a nonrotatable sleeve encircling a portion of the shaft projection, a spooling drum rotatably mounted on axially spaced bearings carried by the sleeve, and clutch means associated with the outer end of the shaft adapted to establish a releasable driving connection between the shaft and the spooling drum, the clutch means including cooperating friction elements actuated by relative axial movement, at least one of said elements encircling a portion of the spooling drum.

20. In combination, a rotary shaft supported in space bearings and having a projecting end extending beyond one of the bearings, a nonrotatable sleeve encircling a portion of the shaft projection, a spooling drum rotatably mounted on axially spaced bearings carried by the sleeve and maintained against axial movement relative thereto, and clutch means associated with the outer end of the shaft adapted to establish a releasable driving connection between the shaft and the spooling drum.

21. In combination, a spooling drum, a clutch disk encircling a portion of the spooling drum, means to rotatably support said drum, means to releasably drive said drum, said means including a pair of friction disks, between which said clutch disk is positioned, yeldable means normally acting to separate said friction disks, a pair of thrust bearings normally acting to resist the separation of the friction disks, and power means operatively positioned between said bearings, said power means including an expansible fluid chamber and a movable element which acts to compress said yieldable means and frictionally engage said clutch disk when fluid pressure is applied to said chamber.

22. In combination, a spooling drum, means to rotatably support said drum, releasable clutch means adapted to drive said drum including a radially extending clutch disk non-rotatably associated with said drum and a pair of friction disks between which the clutch disk is positioned, the clutch disk encircling a portion of the drum, yieldable means normally acting to axially separate the friction disks, means including a thrust bearing normally acting to resist the separation of the friction disks, and power means including an expansible fluid chamber having a movable element, said movable element being adapted to apply an axial force on said thrust bearing to compress the yieldable means and frictionally engage said clutch disk when fluid pressure is applied to said chamber.

23. In combination, a spooling drum, means to rotatably support said drum, releasable clutch means adapted to drive said drum including a radially extending clutch disk slidably but non-rotatably associated with said drum and a pair of friction disks between which the clutch disk is positioned, the clutch disk encircling a portion of the drum, yieldable means normally acting to axially separate the friction disks and to space the clutch disk for free rotation there-between, means including a thrust bearing normally acting to resist the separation of the friction disks, and power means including an expansible fluid chamber having a movable element, said movable element being adapted to apply an axial force on said thrust bearing to compress the yieldable means and frictionally engage said clutch disk when fluid pressure is applied to said chamber.

24. In combination, a spooling drum having axially spaced flanges, means to rotatably support said drum, a radially extending clutch disk non-rotatably associated with said drum and encircling a portion thereof, a pair of frictfion disks between which the clutch disk is positioned, yieldable means normally acting to separate said friction disks, a thrust bearing located in a position intermediate one of the drum flanges and one of the friction disks and adapted to resist the separation of the friction disks, and power means including an expansible fluid chamber having a movable element, said movable element being adapted to apply an axial force on said thrust bearing to compress the yieldable means and frictionally engage the clutch disk when fluid pressure is applied to said chamber.

25. In a device of the class described, the combination of a rotary member, a stationary sleeve encircling a portion of the rotary member, a spooling drum, means including bearing means for rotatably supporting the spooling drum on the sleeve, the sleeve having a radially extending flange at one side of the spooling drum, an axially movable thrust-applying element cooperating with the flange to define an annular pressure chamber therebetween, an axially immovable ring fixed to the rotary member on the other side of the spooling drum, friction drive means operatively interposed between said ring and a portion of said spooling drum establishing a releasable driving connection between the rotary member and the spooling drum, means to introduce fluid into the annular pressure chamber to move the thrust-applying element axially, and means whereby axial movement of said element may effect operation of the friction drive means.

26. In a device of the class described, the combination of a rotary member, a stationary sleeve encircling a portion of the rotary member, a spooling drum, means including bearing means for rotatably supporting the spooling drum on the sleeve, the sleeve having a radially extending flange at one side of the spooling drum, an annular flexible diaphragm fixed on its inner and outer periphery to said sleeve flange and cooperating therewith to form an expansible pressure chamber, an axially movable thrust-applying element engaged by said diaphragm, an axially immovable ring fixed to the rotary member on the other side of the spooling drum, friction drive means operatively interposed between said ring and a portion of said spooling drum establishing a releasable driving connection between the rotary member and the spooling drum, means to introduce fluid into the pressure chamber to move the thrust-applying element axially, and means whereby axial movement of said element may effect operation of the friction drive means.

27. In a device of the class described, the combination of a rotary member, a stationary sleeve encircling a portion of the rotary member, a spooling drum member rotatably mounted on said stationary sleeve and held against axial movement relative thereto, a stationary member fixed on the sleeve at one side of the spooling drum member, an axially immovable ring removably secured to the rotary member on the other side of the spooling drum member, friction drive means including a plurality of friction disks engageable through relative axial movement and operatively interposed between said ring and a portion of said spooling drum member, said friction drive means establishing a releasable driving connection between the rotary member and the spooling drum member, means for actuating the friction drive means including walls forming an annular expansible pressure chamber, one of said walls comprising an annular flexible diaphragm encircling a portion of the rotary member, an axially movable thrust-applying element engaged by said diaphragm, and means including a fluid inlet fitting on said stationary member for introducing fluid into said expansible pressure chamber.

28. In a device of the class described, the combination of a rotary member, a stationary sleeve encircling a portion of the rotary member, a spooling drum member rotatably mounted on said stationary sleeve and held against axial movement relative thereto, a stationary member fixed on the sleeve at one side of the spooling drum member, an axially immovable drive ring on the rotary member on the other side of the spooling drum member, friction drive means including a plurality of friction disks engageable through relative axial movement and operatively interposed between said ring and a portion of said spooling drum member, said friction drive means establishing a releasable driving connection between the rotary member and the spooling drum member, means for actuating the friction drive means including walls forming an annular expansible pressure chamber, one of said walls comprising an annular flexible diaphragm encircling a portion of the rotary member, an axially movable thrust-applying element engaged by said diaphragm, and means including a fluid inlet fitting on said stationary member for introducing fluid into said expansible pressure chamber.

29. In a device of the class described, the combination of a rotary member, a stationary sleeve encircling a portion of the rotary member, a spooling drum member rotatably mounted on said stationary sleeve and held against axial movement relative thereto, a stationary member fixed on the sleeve at one side of the spooling drum member, an axially immovable torque-transmitting ring fixed on the rotary member on the other side of the spooling drum member, friction drive means including a plurality of friction disks engageable through relative axial movement for establishing a releasable driving connection between the rotary member and the spooling drum member, one of said friction disks being keyed for axial sliding movement relative to said ring and another of said friction disks being keyed for axial sliding movement relative to the spooling drum member, means for actuating the friction drive means including walls forming an annular expansible pressure chamber, one of said walls comprising an annular flexible diaphragm encircling a portion of the rotary member, an axially movable thrust-applying element engaged by said diaphragm, and means including a fluid inlet fitting on said stationary member for introducing fluid into said expansible pressure chamber.

30. In a cathead device of the type described, the combination of: a rotary drive member, a non-rotary sleeve encircling a portion of the rotary drive member, a spooling drum rotatably mounted upon said sleeve, a radially extending flange element on the sleeve at one side of the spooling drum, a thrust element cooperating with the flange element to define an annular pressure chamber therebetween, the elements being mounted for relative axial movement, an axially immovable ring fixed to the rotary drive member on the other side of the spooling drum, friction drive means operatively interposed between said ring and a portion of said spooling drum establishing a releasable driving connection between the rotary member and the spooling drum, a thrust bearing operatively interposed between one of said elements and the rotary member, means to introduce fluid into the annular pressure chamber to effect axial movement of the other of said elements, and means including a second thrust bearing whereby axial movement of the latter said element may effect operation of the friction drive means.

31. In a cathead device of the type described, the combination of: a rotary member provided with an axially immovable ring, a stationary sleeve encircling a portion of the rotary member and provided with a radially extending flange, a spooling drum rotatably mounted upon said sleeve and positioned between said ring and flange, friction drive means establishing a releasable driving connection between the rotary member and the spooling drum, said friction drive means including a clutch face provided on said ring, an axially shiftable clutch element, means mounting the clutch element for axial sliding movement relative to the ring but preventing relative turning movement therebetween, a clutch disk interposed between said clutch face and said clutch element, means connecting said disk for axial sliding movement relative to the spooling drum but preventing relative turning movement therebetween, spring means on said ring tending to move the clutch element away from the clutch face, an abutment on the spooling drum, additional spring means on the spooling drum tending to move the disk against said abutment, and thrust-applying means including a fluid pressure chamber associated with said flange for clamping the disk between said clutch face and clutch element in opposition to both said spring means.

SPENCER W. LONG.

References Cited in the file of this patent

UNITED STATES PATENTS

| Number | Name | Date |
|---|---|---|
| 375,739 | Flohr | Jan. 3, 1888 |
| 1,574,086 | Hansen | Feb. 23, 1926 |
| 2,225,666 | Simmons | Dec. 24, 1940 |
| 2,328,133 | Foster | Aug. 31, 1943 |
| 2,329,943 | Robins | Sept. 21, 1943 |
| 2,391,939 | Bannister | Jan. 1, 1946 |